United States Patent [19]

Marano

[11] Patent Number: 4,818,259

[45] Date of Patent: Apr. 4, 1989

[54] AIR FILTRATION DEVICE

[75] Inventor: Gary L. Marano, Redwood City, Calif.

[73] Assignee: Jet-Flow Filtration Co., Redwood City, Calif.

[21] Appl. No.: 144,968

[22] Filed: Jan. 19, 1988

[51] Int. Cl.⁴ .............................................. B01D 53/14
[52] U.S. Cl. .................................... 55/227; 55/228; 55/255; 55/256; 55/259
[58] Field of Search ................. 55/227, 255, 256, 228, 55/259, 86, 95

[56] References Cited

U.S. PATENT DOCUMENTS

| | | | |
|---|---|---|---|
| 942,037 | 11/1909 | Markstein | 55/256 |
| 2,988,166 | 6/1961 | Klemm | 55/256 X |
| 3,486,307 | 12/1969 | McDermott | 55/256 X |
| 4,553,991 | 11/1985 | Barsacq | 55/256 X |
| 4,721,516 | 1/1988 | Barsacq | 55/227 X |

*Primary Examiner*—Charles Hart
*Attorney, Agent, or Firm*—Flehr, Hohbach, Test, Albritton & Herbert

[57] ABSTRACT

A wet dust collecting and filtration system incorporates an upright settling tank in the bottom of which is formed a pool of water at a defined level. The dust carrying air is supplied to the tank through an air transfer pipe under pressure supplied by a blower which is mounted on the same portable cart as the settling tank. Connected to the air inlet that receives the air from the transfer pipe is an "L" shaped pipe that extends down from the dirty air inlet and terminates in a conical funnel ending below the surface of the water pool. The water is supplied under significant pressure so that an envelope of water is formed that seals the top of the pool of water against the edges of the funnel. The resulting scrubbing action of the air causes precipitation of the dirt, dust and soot which is carried into the air into the water. The precipitates sink toward the bottom of the pool while the air itself flows up out of the water to be withdrawn from the top of the tank. In a preferred embodiment, a secondary dry element filter is supported at the top of the tank through which the air is withdrawn, the presence of this filter element preventing the water from spraying out the top of the tank, refiltering the air before final exhausting to atmosphere.

4 Claims, 1 Drawing Sheet

U.S. Patent
Apr. 4, 1989
4,818,259
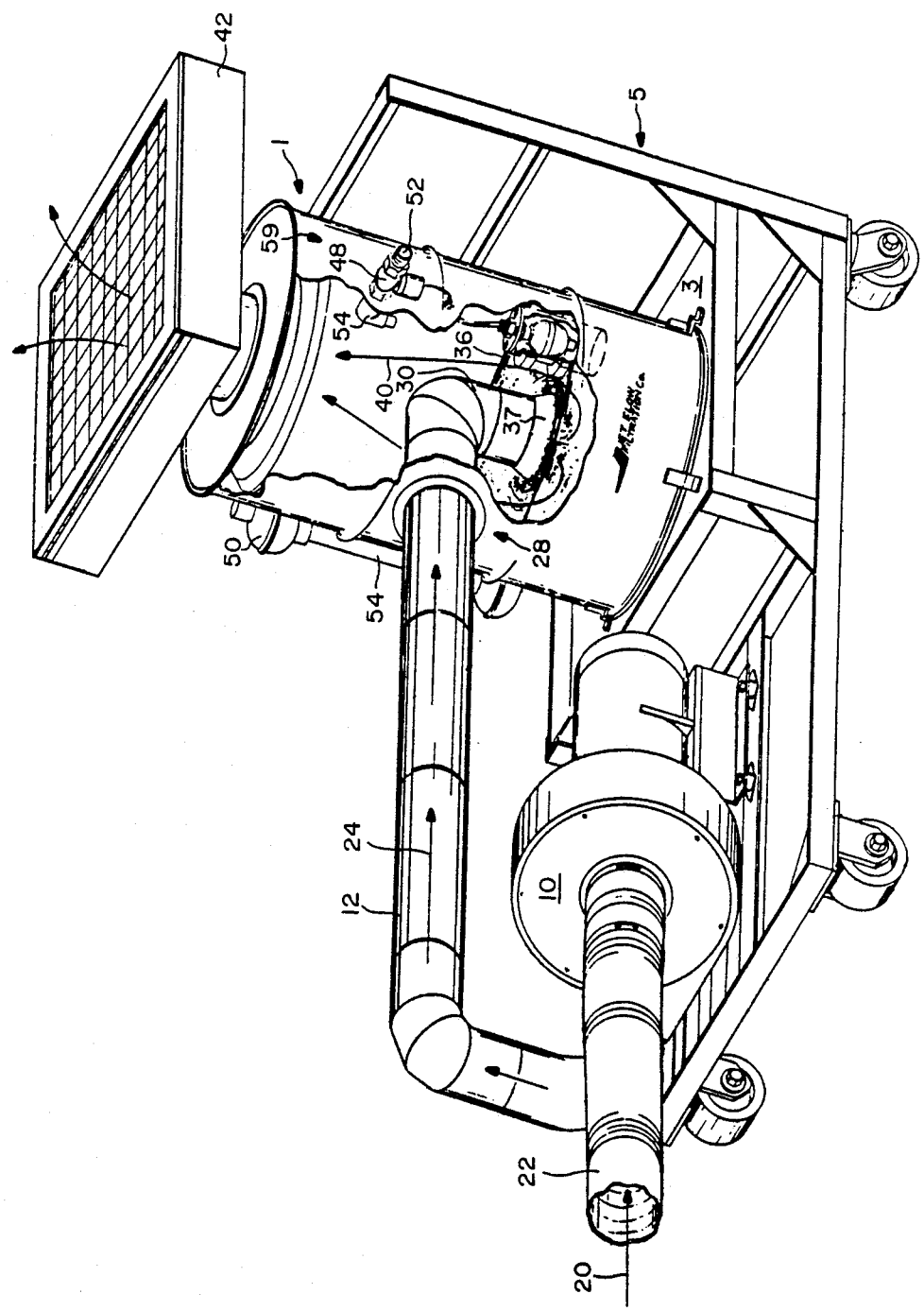

AIR FILTRATION DEVICE

This invention relates to air cleaning devices, and in particular to a device using water to precipitate dust from a dust carrying air stream.

BACKGROUND OF THE INVENTION

Wet dust collectors that operate by passing and contacting a dirty stream of air with water as presently designed have several drawbacks. In the known systems, the water is typically sprayed or atomized and the dirt carrying stream of air is passed through the water. In the first place, because full contact of the air stream with the vapor is usually not achieved, the collecting effect is lessened and is relatively inefficient. Secondly, since a spray manifold and a pump for supplying pressurized water must be provided, the dust collector is typically costly and complex in construction. Thirdly, the collector cannot function without a continuing supply of water. Therefore, the dust collector is rendered non-portable, because of the need for a water supply connection.

SUMMARY OF THE INVENTION

This invention is directed toward overcoming the deficiencies of prior art wet dust collecting devices. More particularly, it is an object of this invention to provide a wet dust collecting device that is economical to manufacture and operate.

Another object of this invention is to provide a wet dust collecting device that is portable, and adaptable for use either with an intermittent fresh supply of water, or with a permanent water supply.

A further objective herein is to provide a wet filtration system in which the precipitative dust or dirt is easily removed from the water after it has been precipitated out.

Another objective herein is to provide a dust collecting device that does not incorporate spraying means or other movable parts so as to be simple in construction, inexpensive, and relatively free of mechanical breakdowns.

Another objective herein is to provide a dust collecting device that is readily adaptable to the effective and efficient separation of any desired type of dirt, fly ash, soot or other particulate matter present in the stream of air presented to the dust collector.

Another objective is to provide a wet dust collecting filtration system wherein the system is easily adapted to incorporation of a secondary filtration system so that any desired level of air cleanliness can be directly achieved.

These and other objectives of this invention are achieved in a wet dust collecting and filtration system incorporating an upright settling tank in the bottom of which is formed a pool of water at a defined level. The dust carrying air is supplied to the tank through an air transfer pipe under pressure supplied by a blower which is mounted on the same portable cart as the settling tank. Connected to the air inlet that receives the air from the transfer pipe is an "L" shaped pipe that extends down from the dirty air inlet and terminates in a conical funnel ending below the surface of the water pool. The water is supplied under significant pressure so that an envelope of water is formed that seals the top of the pool of water against the edges of the funnel. The resulting scrubbing action of the air causes precipitation of the dirt, dust and soot which is carried into the air into the water. The precipitates sink toward the bottom of the pool while the air itself flows up out of the water to be withdrawn from the top of the tank. In a preferred embodiment, a secondary dry element filter is supported at the top of the tank through which the air is withdrawn, the presence of this filter element preventing the water from spraying out the top of the tank, refiltering the air before final exhausting to atmosphere.

A further embellishment of the preferred embodiment is a separator and scavenger system operating on principles of centrifugal force and mounted on the side of the tank to cleanse the solids from the water and allow the water to be returned to the tank.

BRIEF DESCRIPTION OF THE DRAWINGS

The objects and features of this invention will become more apparent from the following description taken in connection with the accompanying drawings, wherein the figure is an elevation, partially in section, of a wet filtration system.

DETAILED DESCRIPTION OF A PREFERRED EMBODIMENT

With reference to the figure, the dust collecting device according to this invention includes a cylinder 1 supported in an upright position on a platform 3 which is a part of a movable cart 5. This cart also supports a high pressure direct drive blower 10 which is connected through an air transfer and vacuum hose 12 to an air inlet to the cylinder 1. The blower 10 is supported on a lower level than the cylinder tank 1 in order to obtain the lowest possible center of gravity for the entire assembly. Combining the blower 10 and cylinder 1 on the cart 5 produces a mobile unit that may be used wherever it is necessary or desirable in a factory environment.

To consider the details of this invention as shown in the sectional cutaway view in FIG. 1, the dirt or dust carrying air as represented by the dark arrow 20 arrives at the high pressure blower 10 through the inlet pipe 22.

This inlet 22 is connected to the source of the air which is to be treated by the system. Although this air represented by air flow arrow 20 may be arriving at the blower at some velocity, the effective operation of the system requires a very high speed air flow. Preferably, the air flow rate through the transfer hose 12 as represented by arrow 24 from the output of the direct drive blower 10 is on the order of 2,000 feet per minute. For a 6" pipe 12, it is desirable to have a blower rated at a capacity of about 5 horsepower to achieve this air flow velocity.

The air flows into the cylindrical tank 1 at an inlet 28 and flows into an "L" shaped pipe 30. The "L" shape of the pipe 30 is to carry the air from the inlet 28 located near the top of the tank 1 down toward the bottom of the tank 1, with the pipe 30 terminating in a preferably conical flange 32. The high speed air flow as represented by the arrow 34 exits from the pipe at the flange into the water. Preferably, the surface of the water 36 in the bottom of the tank 1 is when the water is at rest about at the junction 37 between the conical funnel 32 and the pipe 30.

In actual operation, the air driven by the direct drive blower 10 is driven forcefully along the path marked by arrows 24 and 34, exiting under water, through the conical funnel 32. The air driven at a rate of 2,000 feet per minute in a preferred embodiment, exits at such a velocity as to create a curtain of water which effectively precipitates out the soot or other material carried in the air stream 34 and allows the air itself to exit along a path indicated by the arrows 40. It has been found that this action is highly efficient at preventing any of the soot or dirt from escaping from the water, and results in a very clean air flow along the path 40 with the use of a relatively simple structure.

At the top of the drum, in an alternative embodiment of this invention, a filter 42 is provided. This panel dry element filter is important for two purposes. In the first place, the turbulence created in the water will cause some splashing of the water up toward the top of the drum. The placement of this filter allows the air to escape without allowing the water to escape, thus preserving the water level within the system. Secondly, in most systems it is extremely difficult to add a secondary filter where further air purification or filtering is desired. In this system, the addition of such secondary filter or maintenance or upgrading is extremely simple and direct.

Note also that the present embodiment incorporates a liquid level control switch 44 placed at the desired level of the water in the drum. The control output 46 of this liquid level switch is coupled to the solenoid 48 of a valve generally indicated at 50 which provides a connection between a water line 52 and an inlet pipe 54 to the interior of the tank. In this way, if there should be some water loss with continued operation of the system, the water can automatically be replaced simply by providing a water connection to the valve 50 and activating the solenoid 48.

In order to maintain the water level in the drum, and simplify the cleaning of the water, an inline separator and scavenger system 50 is mounted on the side of the drum. This system generally comprises an inlet into the upper bowl 52 which operating on the basis of centrifugal action, spins the recovered dirt and soil out of the water, with the residue being captured therein and the water being allowed to flow down a return pipe 54 for return to the drum. By use of this system, the need for constant replenishment of the water in the drum is minimized, and the operation of removing the soil or other recovered materials from the dirty air is simplified.

Other modifications and improvements of this invention may occur to a person of skill in the art who studies this disclosure. Therefore, the scope of this invention is to be limited only by the following claims.

What is claimed:

1. A wet dust collective device for efficiently removing dirt or other particles from air comprising an upright cylindrical tank forming a settling chamber for the dirt to be collected, the chamber being filled with water to a defined level, the tank having a dirty air inlet substantially above the water level an L-shaped pipe extending down from said dirty air inlet to below the level of the water in the chamber, said L-shaped pipe terminating in a flared cap portion for carrying dirty air below the surface of the water and causing the air to flow in a turbulent fashion through the water, the dust settling to the bottom of the chamber, a dry element filter located on the top of said tank and said chamber for providing secondary cleaning of the air, and means for conveying the dirty air to the tank at high pressure comprising a high pressure direct drive blower and an air transfer hose having an end coupled to said dirty air inlet to said chamber and an inlet end coupled to a high pressure outlet of said high pressure direct drive blower, said blower receiving said dirty air at its inlet and propelling it through said air transfer pipe and said L-shaped pipe at sufficient power to cause significant turbulence in the water where the air exits from the pipe, whereby the dirt is precipitated from the air and settles to the bottom of the tank.

2. A wet dust collective device as in claim 1 including a liquid level detecting device mounted on the side of said tank above the lower end of said downspout for monitoring the water level in the tank, and a water inlet in the side of said tank above said level detector connected to a source of water and controlled by a solenoid connected to a source of water and controlled by a solenoid connected to a signal output from said level detecting device for supplying water to the chamber and maintaining the defined water level in the chamber.

3. A wet dust collecting device as in claim 2 including a separator mounted on the side of said tank fed by a pump and separating the precipitated solids from the water in the chamber by centrifugal force, the water returning by gravity to the tank or to a drain, the solids being easily disposed of.

4. A wet dust collecting device as in claim 3 wherein the waterline of the water in the tank is slightly above the level of the end of the conical funnel.

* * * * *